US008887099B1

(12) United States Patent
Simeloff (10) Patent No.: US 8,887,099 B1
(45) Date of Patent: Nov. 11, 2014

(54) MANAGING DATA HIERARCHICALLY IN A USER INTERFACE

(75) Inventor: Ezra Simeloff, Austin, TX (US)

(73) Assignee: Oracle America, Inc., Redwood Shores, CA (US)

( * ) Notice: Subject to any disclaimer, the term of this patent is extended or adjusted under 35 U.S.C. 154(b) by 2304 days.

(21) Appl. No.: 11/238,332

(22) Filed: Sep. 29, 2005

Related U.S. Application Data

(60) Provisional application No. 60/647,507, filed on Jan. 27, 2005.

(51) Int. Cl.
*G06F 3/048* (2013.01)
*G06F 3/00* (2006.01)

(52) U.S. Cl.
USPC .......... 715/853; 715/810; 715/764; 715/713; 715/850

(58) Field of Classification Search
USPC ........ 715/764, 713, 853, 810; 395/12, 50, 60; 364/518, 521
See application file for complete search history.

(56) References Cited

U.S. PATENT DOCUMENTS

| | | | |
|---|---|---|---|
| 5,911,145 A * | 6/1999 | Arora et al. | 715/207 |
| 6,300,947 B1 * | 10/2001 | Kanevsky | 715/866 |
| 6,345,273 B1 * | 2/2002 | Cochran | 707/4 |
| 6,356,899 B1 * | 3/2002 | Chakrabarti et al. | 707/5 |
| 6,961,731 B2 * | 11/2005 | Holbrook | 1/1 |
| 6,986,102 B1 * | 1/2006 | Baer et al. | 715/206 |
| 7,035,864 B1 * | 4/2006 | Ferrari et al. | 707/102 |
| 7,062,483 B2 * | 6/2006 | Ferrari et al. | 707/3 |
| 7,181,684 B2 * | 2/2007 | Chittu et al. | 715/255 |
| 8,161,413 B2 * | 4/2012 | Chen et al. | 715/854 |

OTHER PUBLICATIONS adobe.com, Adobe Announces Adobe 7.0 Software Availability, Jan. 5, 2005, Adobe.Com.*
Adobe Creative Team, Adobe Acrobat 5.0 Classroom in a Book, Jun. 26, 2001, Chapter: Getting to Know the Work Area, pp. 1-6.*
Adobe Creative Team, Adobe Acrobat 5.0 Classroom in a Book, Jun. 26, 2001, Chapter: Overview, pp. 1-3.*

* cited by examiner

*Primary Examiner* — Amy Ng
*Assistant Examiner* — Erik Stitt
(74) *Attorney, Agent, or Firm* — Osha Liang LLP (57) ABSTRACT

A user interface includes a parent node comprising a plurality of child nodes, where the parent node and the plurality of child nodes are related in accordance with a hierarchical structure, and a pagination utility is configured to display a paginated page for a paginated node, where the paginated node is a child node from the plurality of child nodes, where the paginated page includes a portion of data associated with the paginated node, and where the paginated utility is displayed with a sibling node of the paginated node.

20 Claims, 8 Drawing Sheets

MANAGING DATA HIERARCHICALLY IN A USER INTERFACE

CROSS-REFERENCE TO RELATED APPLICATIONS

This application claims benefit under 35 U.S.C. §119(e) of U.S. Provisional Patent Application Ser. No. 60/647,507 filed Jan. 27, 2005, entitled "MANAGING DATA IN A WEB BASED USER INTERFACE" the entirety of which is incorporated herein by reference.

BACKGROUND

User interfaces (UIs) allow the user of a computer system to interact with the system and to control the display of data. Typically, a UI has multiple functions represented by icons, buttons, links, etc., that may be used to display and/or control data.

Tree structures are often used in UIs in order to display hierarchical data in a manner that presents the data in the context of the hierarchy. For example, in an electronic mail (e-mail) application, an inbox containing e-mail messages may be displayed using a tree-based hierarchical structure, where the inbox contains folders that are parent nodes. Each folder includes e-mail messages that appear as child nodes.

In such hierarchical structures, when the amount of data to be displayed exceeds the size of the available data window, the benefit of viewing the desired data in relation to the hierarchy is lost because the user is required to scroll the data window in order to view the data and the hierarchy in its entirety. The hierarchical data represented in the tree structure on the UI is often based on a tree data structure. For example, the hierarchical data for the UI may be contained in a binary tree data structure, where each node in the tree has at most two child nodes.

Pagination may be used in a UI to provide a way to divide data into manageable pages in an effort to handle the display of large amounts of data. For example, results from a web search engine or a notification list of email messages in an email inbox are often presented to the user as a set of pages for the user to peruse with portions of the information (e.g., results from the web search engine, a notification list, etc.) displayed on separate pages.

SUMMARY

In general, in one aspect, the invention relates to a user interface includes a parent node comprising a plurality of child nodes, wherein the parent node and the plurality of child nodes are related in accordance with a hierarchical structure, and a pagination utility configured to display a paginated page for a paginated node, wherein the paginated node is a child node from the plurality of child nodes, wherein the paginated page comprises a portion of data associated with the paginated node, and wherein the pagination utility is displayed with a sibling node of the paginated node.

In general, in one aspect, the invention relates to a method for generating a user interface. The method involves obtaining a hierarchical structure comprising a parent node and plurality of child nodes, and configuring a pagination utility to display a paginated page for a paginated node, wherein the paginated node is a child node from the plurality of child nodes, wherein the paginated page comprises a portion of the data associated with the paginated node, and wherein the pagination utility is displayed with a sibling node of the paginated node.

In general, in one aspect, the invention relates to computer system. The computer system includes a processor, an input device, and a display device using the processor to display a user interface. The user interface includes a parent node comprising a plurality of child nodes, wherein the parent node and the plurality of child nodes are related in accordance with a hierarchical structure; and a pagination utility configured to display a paginated page for a paginated node on the display device, wherein the paginated node is a child node from the plurality of child nodes, wherein the paginated page comprises a portion of the data associated with the paginated node, and wherein the pagination utility is displayed with a sibling node of the paginated node on the display device.

Other aspects and advantages of the invention will be apparent from the following description and the appended claims.

DETAILED DESCRIPTION

Exemplary embodiments of the invention will be described with reference to the accompanying drawings. Like elements in the various figures are denoted by like reference numerals for consistency.

In the following detailed description of the invention, numerous specific details are set forth in order to provide a more thorough understanding of the invention. In other instances, well-known features have not been described in detail to avoid obscuring the invention.

In general, the present invention relates to managing data in a user interface. More specifically, embodiments of the invention combine the tree structure user interface and pagination utilities in an effort to preserve the presentation of data in the context of a hierarchy irrespective of the amount of data that the user needs to display. Embodiments of this invention allow the user to view the hierarchy of parent and child node, and the desired data of a child node by portioning the data of the child node into pages in an effort to limit the amount of scrolling of the data window necessary to view the desired data in the context of the hierarchy.

Figure 1:
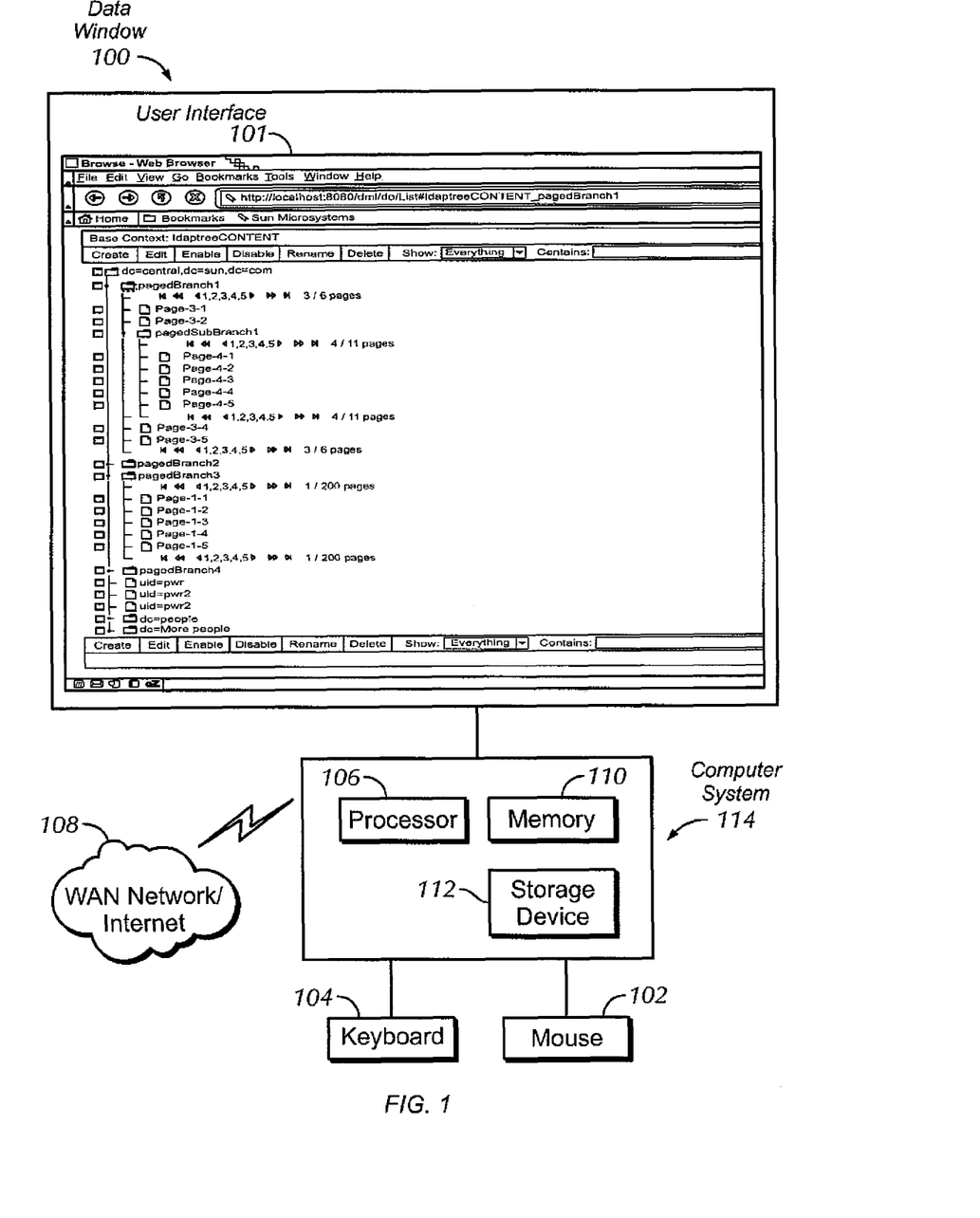
FIG. 1 shows a system in accordance with an embodiment of the present invention.

FIG. 1 shows a computer system in accordance with one embodiment of the invention. The computer system (114) includes a display device (100) on which to view a user interface (101), an input device, such as a mouse (102) and keyboard (104) for the user to communicate instructions for control of the display of data. Those skilled in the art will appreciate that these input and output means may take other forms. The computer system (114) also includes a processor (106), such as a Central Processing Unit (CPU) or a chipset, with which to process the instructions for the display of the user interface (101). In one embodiment, the computer system (114) may be connected to a network via a network interface connection (not shown), such as a local area network (LAN) or a wide area network (108) (e.g., the Internet) to receive instructions for display of the user interface (101). The computer system (114) of this invention can also store the instructions for display of the user interface such as in memory (110) or any type of storage device (112).

Further, those skilled in the art will appreciate that one or more elements of and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

Figure 2:
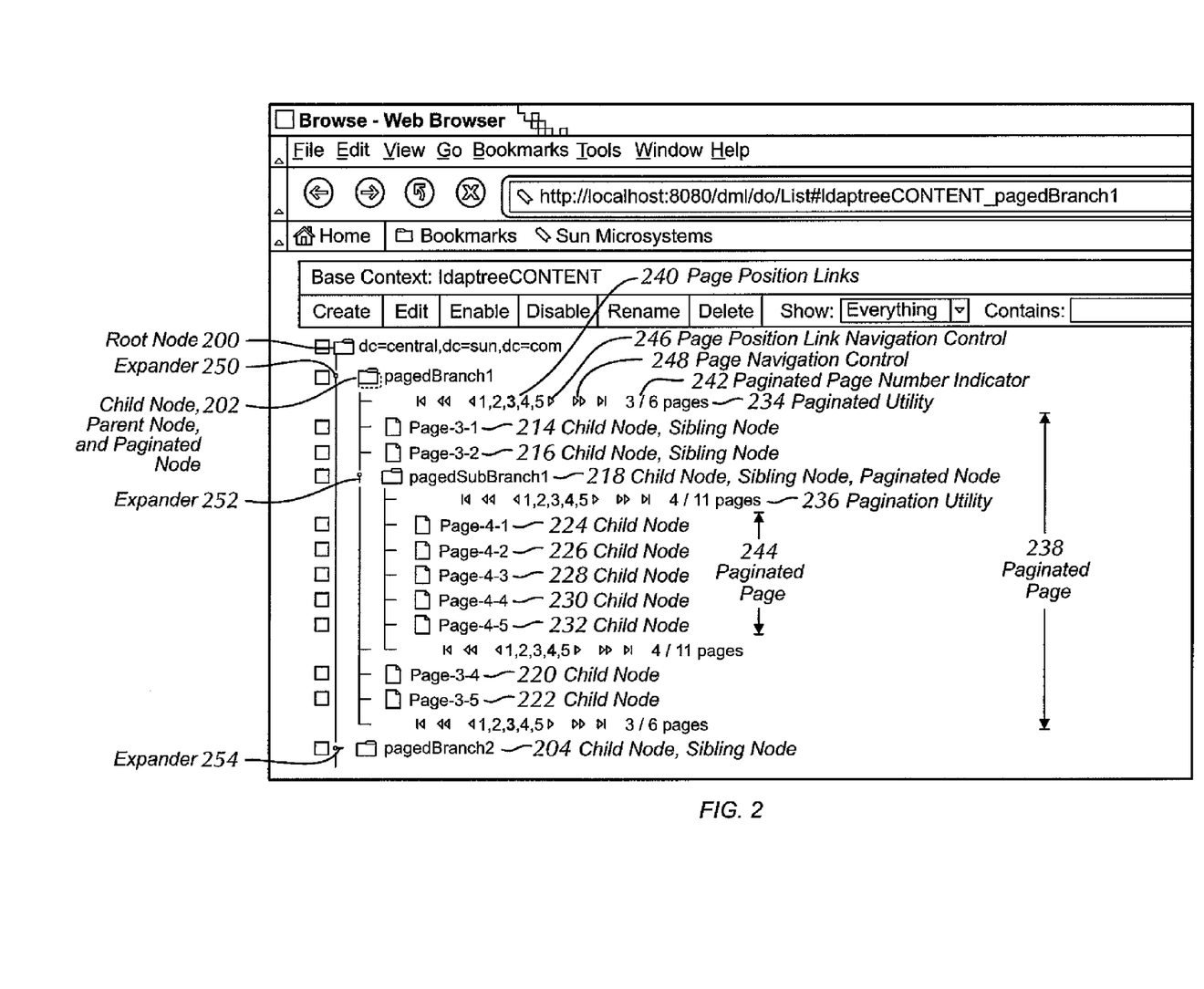
FIG. 2 depicts an exemplary screenshot of a user interface in accordance with an embodiment of the present invention.

FIG. 2 depicts a screenshot of a UI in accordance with one embodiment of the invention. Specifically, FIG. 2 shows a hierarchical tree structure including a root node (200) and several child nodes (i.e., 202, 204) of the root node (200). The root node (200) is the ancestor (i.e., parent node) for all the nodes connected in the hierarchical tree structure of FIG. 2. In one embodiment of the invention, child node (202) of root node (200) is also a parent node associated with multiple child nodes (i.e., 214, 216, 218). Similarly, child node (218) of parent node (202) is also a parent node (218) and is associated with child nodes (224), (226), (228), (230), and (232). In one embodiment of the invention, nodes that have a common parent node are sibling nodes. For example, child nodes (224), (226), (228), (230) and (232) each have a common parent node (i.e., parent node 218) and are thus sibling nodes.

In one embodiment of the invention, a user may select the display of data associated with a particular node (e.g., a child node of a parent node) by clicking on an expander (i.e., 250, 252, 254). Clicking on an expander presents an expanded view and displays data associated with a node. In one embodiment of the invention, an expander may denote that an expanded view of a particular node is shown by changing the appearance of the expander by, e.g., rotating downward when an expanded view of a node is displayed, as shown in FIG. 2. Those skilled an expanded view of a node is displayed in several other ways, such as rotating a different direction, changing color, flipping horizontally or vertically, etc.

Continuing with the discussion of FIG. 2, in one embodiment of the invention, parent nodes may be paginated nodes (e.g., node (202) is a parent paginated node), which are nodes that include a pagination utility (234). In one embodiment of the invention, a paginated node is displayed in the context of the hierarchy with a sibling node. For example, paginated node (202) is displayed with its sibling node (i.e., node (204)). Alternatively, in one embodiment of the invention, a paginated node may be displayed in the context of the hierarchy with an associated parent node and a sibling node. In this case, paginated node (202) may be displayed with parent node (200) and sibling node (204). In FIG. 2, parent node (200) and parent node (202) are also displayed with the pagination utility (236) of the paginated node (218) in the context of the hierarchy with sibling nodes (214), (216), (220) and (222).

In one embodiment of the invention, the pagination utility (234) is configured to allow the user to control the display of the data associated with the paginated node (202). As shown in FIG. 2, a portion of the data associated with the paginated node (202) displays on a paginated page (238). Specifically, FIG. 2 shows the pagination utility (234) configured to display paginated page (238) at page position 3 (240) out of 6, as denoted by a paginated page number indicator (242), of the paginated node (202). The portion of data that displays on a paginated page is determined by a data display maximum indicator. In FIG. 2, the data display maximum indicator for the paginated page (238) is five therefore the following five child nodes associated with paginated node (202) display on the paginated page (238): (214), (216), (218), (220), and (222). Similarly, for paginated node (218), the data display maximum indicator is five with the following child nodes that display on the paginated page (244): (224), (226), (228), (230) and (232).

In one embodiment of the invention, the pagination utility (234) includes a page navigation control (248), which includes page position links (240), and a page position link navigation control (246). Each of the aforementioned portions of the pagination utility is described below. The page navigation control (248) allows a user to change the page position of the pagination utility (234), thereby changing the paginated page (238) displayed for the paginated node (202). In one embodiment of the invention, the page navigation control (248) consists of page position links (240) which are configured to allow the user to change the page position upon selection by the user. The user is able to specify the number of page position links (240) to display in the page navigation control (248) with a page position link maximum indicator. In FIG. 2, the page position link maximum indicator for paginated node (202) is five, which corresponds to the five page position links (240) displayed. The page position link navigation control (246) allows the user to display the next page position and page navigation control (248) allows the user to change the display of the group of page position links (240).

Those skilled in the art will appreciate that the user interface shown in FIG. 2 may be displayed in different ways. For example, the pagination utility (234) associated with a paginated node may be displayed vertically instead of horizontally. Further, although child node (204) in FIG. 2 is not shown in expanded form, those skilled in the art will appreciate that child node (204) may be expanded to include child nodes and paginated nodes.

Figure 3A:
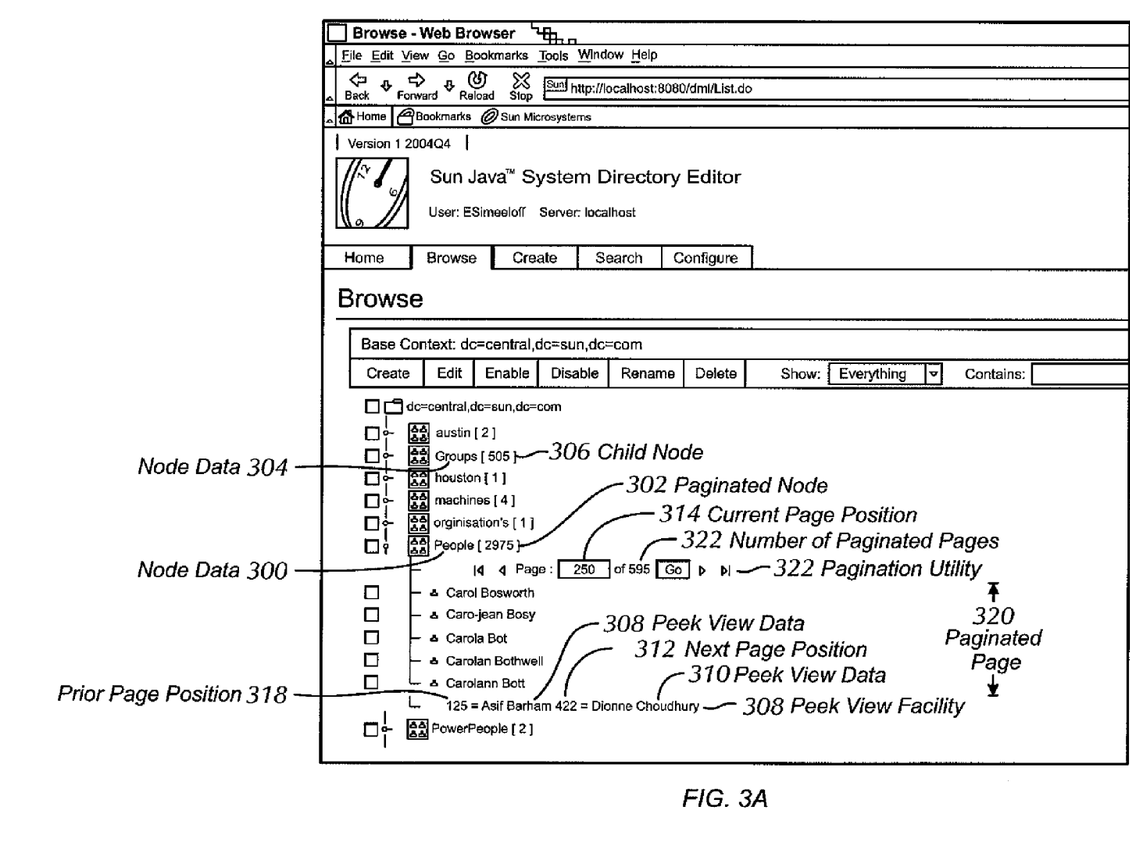
FIGS. 3A-3C depict exemplary screenshots of a user interface in accordance with an embodiment of the present invention.

FIG. 3A depicts a screenshot of a user interface in accordance with an embodiment of the present invention. In one embodiment, the user interface displays information within a Directory Editor using a hierarchical structure. Specifically, the hierarchical structure is viewed in the form of a tree structure with multiple levels of nodes.

Nodes within hierarchical structure view show node data (304) associated with a node (e.g., child node (306)). For example, child node (306) indicates the value of node data (304) as '505', which reflects the number of entries within the child node (306). Similarly, the paginated node (302) indicates the value of node data (300) as '2975', which likewise reflects the number of entries for within the paginated node (302). One skilled in the art will appreciate that while FIG. 3A only displays the number of entries as a single data value, node data (e.g., node data (300), node data (304), etc.) could also display other types of data (e.g., alphabetic range of data in node, last edit date of data in node, etc.), or multiple data values of different types as node data.

Continuing with FIG. 3A, paginated node (302) is displayed with the pagination utility (322). Within pagination utility (322) is a current page position (314) and a number of paginated pages (324). The number of paginated pages (324) of a paginated node (e.g., child node (302)) is determined by examining the amount of data associated with the paginated node and the data display maximum indicator, which indicates the maximum amount of data to have on each page. For example, if a data display maximum indicator is five and the node data (300) for paginated node (302) is '2975', the number of paginated pages (324) indicated within the pagination utility (322) is '595' with five child nodes of paginated node (302) on each of the paginated pages (e.g., paginated page (320)).

In one embodiment, the user interface shown in FIG. 3A contains a peek view facility (308), which is configured to display the peek view data (310, 316) associated with a particular paginated page (i.e., paginated page (320)) for a particular node (i.e., paginated node (302)) where the peek view data (310, 316) is data associated with a paginated page on either side of the current page position (314) (i.e., prior paginated position (318) and/or next paginated position (312)). For example, the current page position (314), as shown in FIG. 3A with the value of '250', is a predefined page number for a paginated page (320) of the paginated node (302). When the user interface displays a particular page position (e.g., the current page position (314) is '250'), the peek view facility (308) displays data for paginated pages on both sides of the current page position (i.e., a prior page position (318) and a next page position (312)). Specifically, the peek view facility (308) shows (i) data associated with the page prior to the current page position of '250', namely peek view data (316) (i.e., Asif Barhan) for prior page position (318) (i.e., 125); and (ii) data associated with the page following to the current page position of '250', namely peek view data (310) (i.e., Dionne Choudhury) for next page position (312) (i.e., 422). One skilled in the art will appreciate the data displayed as peek view data (310, 316) may be any form of data (e.g., file size, dates, etc.) useful to the user of the user interface and not merely limited to names of entries associated with a particular node.

In one embodiment of the invention shown in FIG. 3A, within the pagination utility (322), a current page position (314) (between 1 and the number of paginated pages (324)) may be input into a text box allowing the pagination utility to display the corresponding paginated page.

Figure 3B:
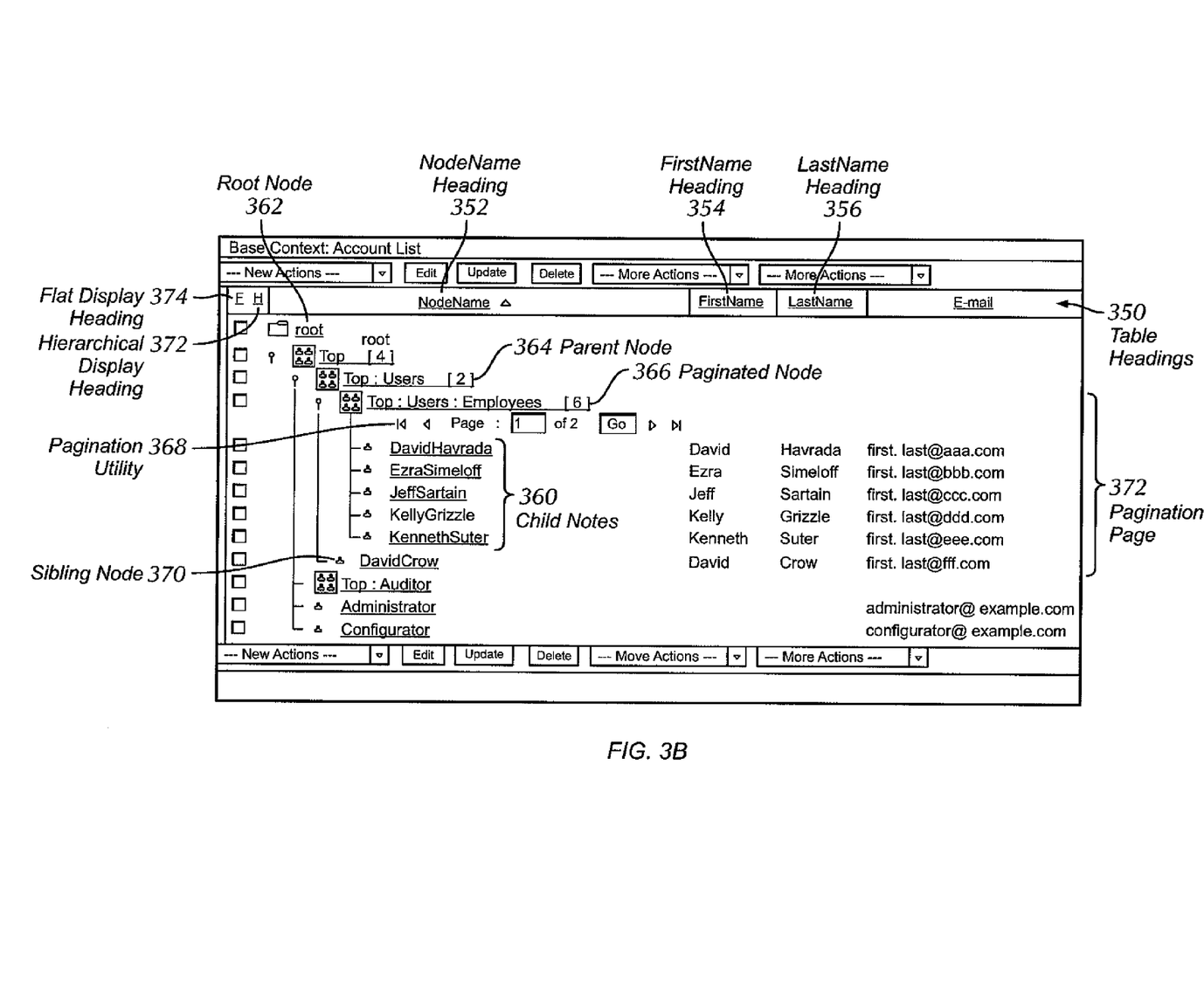

In one embodiment of the invention, the hierarchical structure used within the user interface is displayed in various forms, including a table view. FIG. 3B depicts a screenshot of a user interface showing a table view of the hierarchical structure in accordance with an embodiment of the present invention.

In one embodiment, the table view of the user interface displays information under one or more table headings (350). The table headings (350) may include a NodeName heading (352), a FirstName heading (354), a LastName heading (356), an Email heading (358), etc. The information found below each of the table headings is data related to the particular heading. For example, the name of the employees (i.e., child nodes (360)) are found under the NodeName heading (352). Likewise, the corresponding email address for the employees is found under the Email heading (358).

The view of the hierarchical structure shown in FIG. 3B is similar to the view shown in FIG. 2 and FIG. 3A. Accordingly, displayed below the root node (362) is a parent node (364). A paginated node (366), which is a child of the parent node (364), uses a pagination utility (368) to aid in the display of the numerous child nodes (e.g., child nodes (360)) of the paginated node (366). In one embodiment of the invention, the paginated node (366) is associated with a hierarchical structure. Specifically, the hierarchical structure of paginated node (366) in FIG. 3B is "top:users:employees," which is a hierarchical file system notation for "employees" within a "users" directory that is within a "top" directory. Further, the paginated node data (367) found next to the hierarchical structure of the paginated node (366) indicates that six child nodes (five of which are shown as child nodes (360) under the pagination utility (368) on pagination page (372)) are associated with the paginated node (366).

In one embodiment of the invention, the user interface shows the paginated node (366), the paginated utility. (368), the child nodes (360) displayed within the pagination utility (368), and the sibling node (368) of the parent node (364) all within a pagination page (372). This pagination page (372) allows the user to observe a hierarchical view of the paginated node (356) in context of the large number of child nodes (360) on a single displayed page by using the functionality of the pagination utility (368).

In one embodiment of the invention, the table view of the user interface allows sorting functionality. In one embodiment of the invention, the sorting functionality provides for sorting information below a table heading by clicking on one of the table headings (350). For example, by clicking on the NodeName heading (352), the names found below this heading are sorted within a paginated node (e.g., paginated node (368)). As shown in FIG. 3B, child nodes (360) are sorted alphabetically in ascending order (i.e., from "DavidHavrada" to "KennethSuter").

One skilled in the art will appreciate that while only one pagination node is shown in FIG. 3B, the sorting functionality discussed above would also work within several paginated nodes. Further, one skilled in the art will appreciate that the method used to invoke the sort functionality is not limited to clicking the desired table headings, and could also include accessing a menu item using a drop-down menu, etc. Also, the invention may use any type of sorting algorithms well known in the art, so the manner of or options used while sorting (i.e., ascending, descending, case-sensitive, etc.) may vary widely.

The user interface shown in FIG. 3B allows the option of viewing the portions of the information using a hierarchical display (as denoted by the "H" table heading (372)) or using a flat display (as denoted by the "F" table heading (374)). The view as shown in FIG. 3B is the hierarchical display. By checking the check box under the "F" table heading (374) and next to a level of the hierarchical view, that level is transformed into a flat display in accordance with one embodiment of the invention.

Figure 3C:
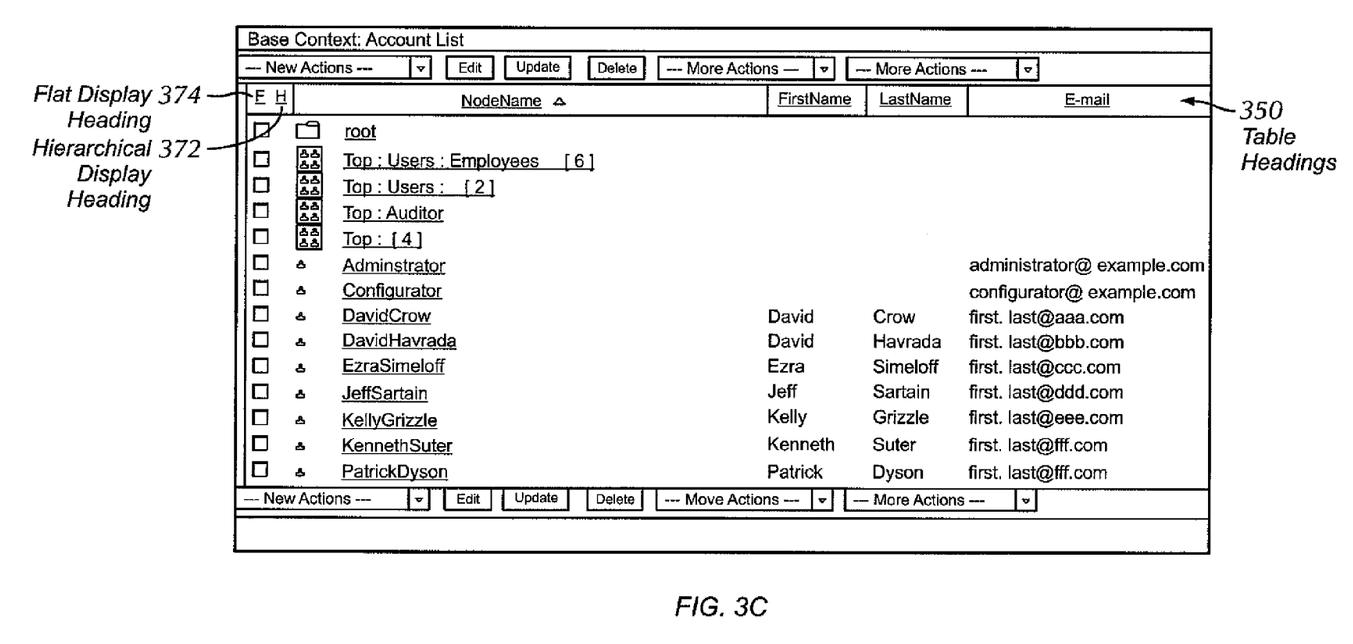

FIG. 3C shows a screenshot of a user interface using the flat display in accordance with an embodiment of the present invention. FIG. 3C displays the same nodes as in FIG. 3B falling under the same table headings (350), however FIG. 3C is a flat display and the nodes are not maintained or displayed in a hierarchical structure.

In a flat display, the nodes in the user interface are ordered based on the table heading type irrespective of the hierarchy. For example, in FIG. 3C the nodes are ordered alphabetically by the node name under the NodeName heading (352) with "DavidCrow" before "DavidHavrada" regardless of the underlying hierarchical structure of the data. In contrast, FIG. 3B (relying on the same underlying data as in FIG. 3C) shows "DavidCrow" sorted as a separate grouping within pagination page (372) because "DavidCrow" is a sibling node (370) of the parent node (364). Thus, "DavidCrow" is not sorted with "DavidHavrada" because data is not deemed to be hierarchically related (i.e., "DavidCrow" is not a child node (360) of the paginated node (366)).

Figure 4:
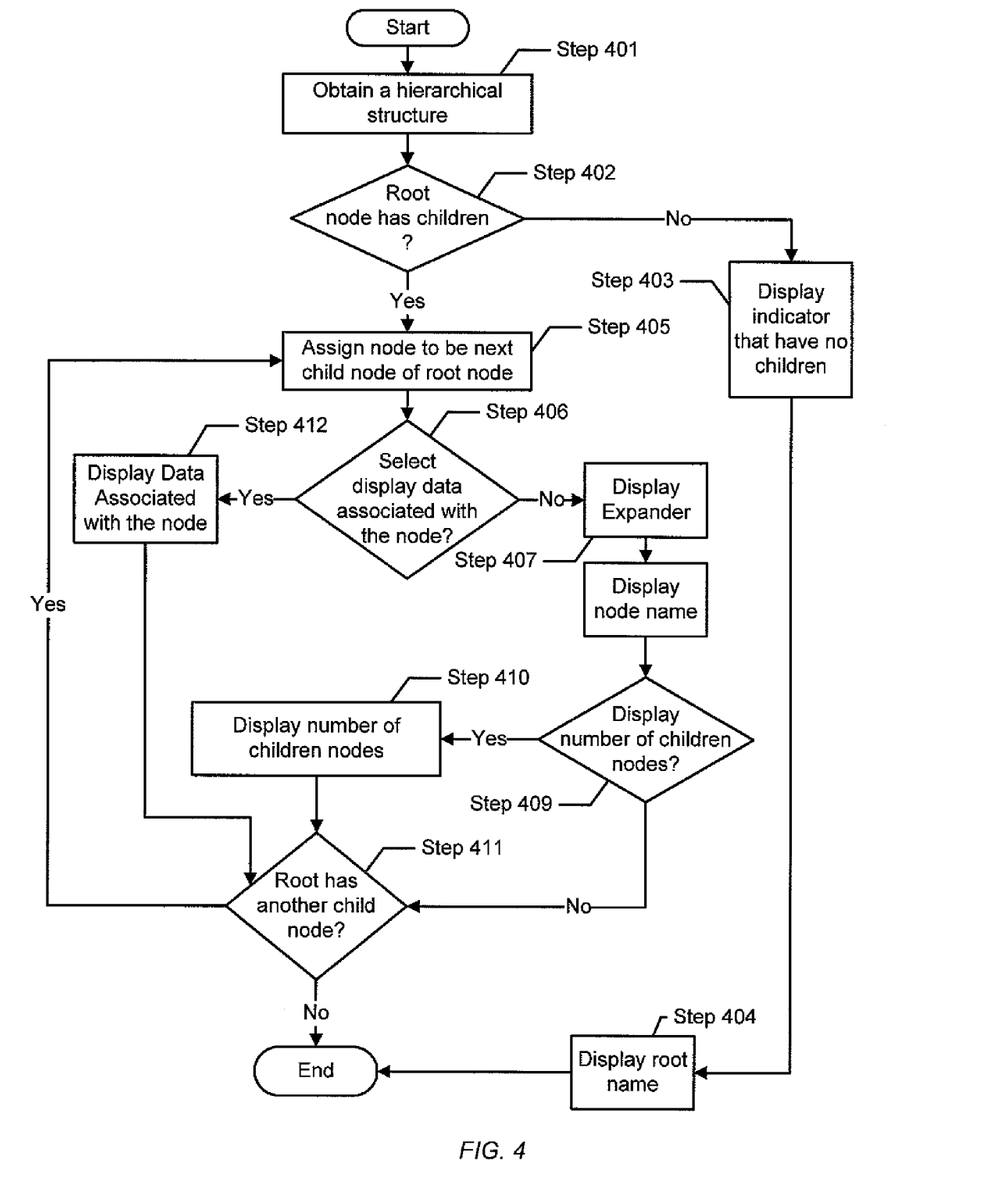
FIGS. 4-6 show flowcharts in accordance with an embodiment of the present invention.

FIG. 4 shows a flowchart for displaying the user interface in accordance with one embodiment of the invention. Initially, a hierarchical structure defining the interface is obtained (Step 401). The hierarchical structure contains data to be displayed within the user interface and the implicit familial relationships between the nodes of data. However, the hierarchical structure may not contain enhancements provided within the user interface display to provide extrinsic information about the nodes and the structure within nodes. For example, enhancements to provide data about the node (e.g., the number of entries in a node), to provide information about the relationship of pages of data for a node within the page displayed within the user interface, etc. is not held within the hierarchical structure. The type and characteristics of the hierarchical structure is often defined by the type of underlying data to be displayed by the user interface and the intended use of the data. The view of the data held in the hierarchical structure is displayed in a form designated by a user, such as a binary tree, a table, etc.

After obtaining the hierarchical structure, a determination is made whether the root node within the hierarchical structure is associated with at least one child node (Step 402). In one embodiment of the invention, if the root node does not have a child node, an indicator is displayed signifying that the root node does not have any children (Step 403). In addition, if the root node does not have any children, the root name may be displayed (Step 404).

Alternatively, if the root node does have at least one child node, then the user interface display initializes the node, a temporary variable used only for facilitating display of the user interface, to be a child node of the root (Step 405). Subsequently, a determination is made as to whether the user wants to display the data associated with the node (Step 406). As described above, data associated with a node may be the child nodes of the node, paginated nodes of the node, or any other data displaying information associated with the node.

In one embodiment of the invention, if the user selects to display the data associated with the node, then the user interface displays the data associated with the node (Step 412) (described below in FIG. 5). Alternatively, if the user selects not to display the data associated with the node, then the user interface displays an expander (Step 407), which indicates that the node has child nodes but that the data associated with the node is not displayed. For example, an expander may be displayed in a closed position (e.g., with the handle portion of an expander in an 'up' position) indicating the node has children nodes, but the user has not selected to display the data associated with the node. For example, expander (254) is shown in FIG. 2 in the closed position indicating that the node has child nodes, which are not displayed. In addition, if the user selects not to display data associated with a node, then the user interface displays the node name (Step 408).

Continuing with FIG. 4, subsequently, a determination is made whether the user wants to display the number of children nodes (Step 409). If the user chooses to display the number of children associated with the node, then a numerical value indicating the number of children nodes is displayed for the user (Step 410). If the user selects not to display the number of children nodes, then the user interface determines whether another child node exists (Step 411) for the root node. In one embodiment of the invention, if root node has another child node, then the user interface assigns the node to be the value of the next child node of the root node (Step 405) and Steps 406-411 are repeated for the newly assigned child node. In one embodiment, this process repeats until the user interface is displayed in a fashion acceptable to the user (or in a fashion best suited for type of data displayed).

Figure 5:
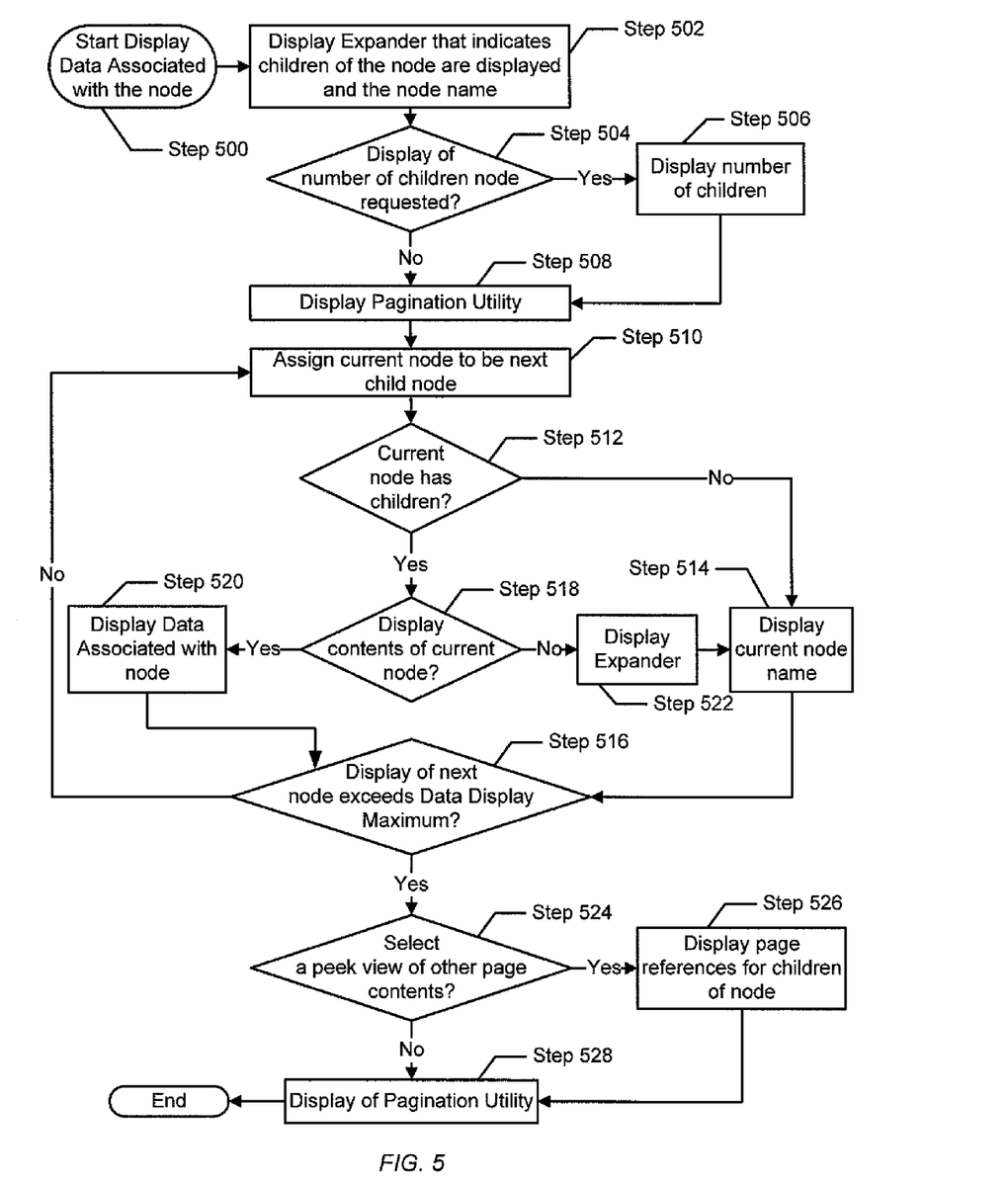

FIG. 5 shows a flowchart for the display of data associated with a paginated node (Step 500) in accordance with one embodiment of the invention. Initially, the process begins with the display of an indicator, such as an expander, that the children nodes are currently displayed for the paginated node (Step 502). For example, an expander may be rotated to an open position to indicate that the children of the node are displayed for the paginated node. For example, expander (252) in FIG. 2 is in the open position indicating that the children of the node are displayed as shown by the display of the children nodes (224, 226, 228, 230, 232).

Next, a determination is made whether to display the number of child nodes of the paginated node (Step 504). If the user wants to display the number of child nodes, then the number of child nodes are displayed (Step 506). Alternatively, if the user does not want to display the child nodes associated with the paginated node, then the pagination utility is displayed (Step 508) (described in FIG. 6 below).

Upon displaying the pagination utility, the current node is assigned as the next child node of the paginated node (Step 510), and a temporary variable is used to go through the child nodes of the paginated node and display the child nodes until the data display maximum indicator for a paginated page has been reached.

Next, a determination is made whether the current node of the paginated node has children nodes (Step 512). If the current node does not have children, then the user interface displays the current node name (Step 514). Subsequently, a determination is made whether the display of the next child node of the paginated node exceeds the data display maximum indicator (Step 516) (discussed in detail below). Alternatively, if the current node has children nodes (Step 512), then a determination is made whether to display the contents of the current node (Step 518).

In one embodiment of the invention, if the user wants to display the contents of the current node, then the current node of the paginated node is a paginated node itself and requires the process of FIG. 5 to be repeated again, as indicated in Step 520. Once again, after display of the data associated with the node, a determination is made whether the display of the next child node of the paginated node exceeds the data display maximum indicator (Step 516) (discussed below). If the user interface determines that the current node does have children (Step 512) and the user does not want to display the data associated with the current node (Step 518), then the user interface displays an expander (as discussed above) (Step 522), to designate to the user the availability of the expansion view for the child node, with the display of the current node name (Step 514). Again, the user interface must determine whether display of the next node exceeds the data display maximum indicator (Step 516), and the amount of data to display on the paginated page.

Continuing with FIG. 5, if the user interface determines that the data display maximum has been reached, then a determination is made whether a peek view of other page content is selected (Step 524). In one embodiment of the invention, a peek view of other page content displays data associated with the paginated node and the page reference or page position where the data associated with the paginated node may be located. If the user selects a peek view, then the page references for the children nodes of the node are displayed (Step 526). Alternatively, if a peek view is not selected, then another display of the pagination utility is provided to a user (Step 528) (described in FIG. 6 below). One with ordinary skill in the art will appreciate that the location of the pagination utility as well as the number of pagination utilities displayed for a paginated node is optional. For example, the pagination utility can be displayed immediately following the paginated node name, or immediately following the last child node on the paginated page, or in both locations.

Figure 6:
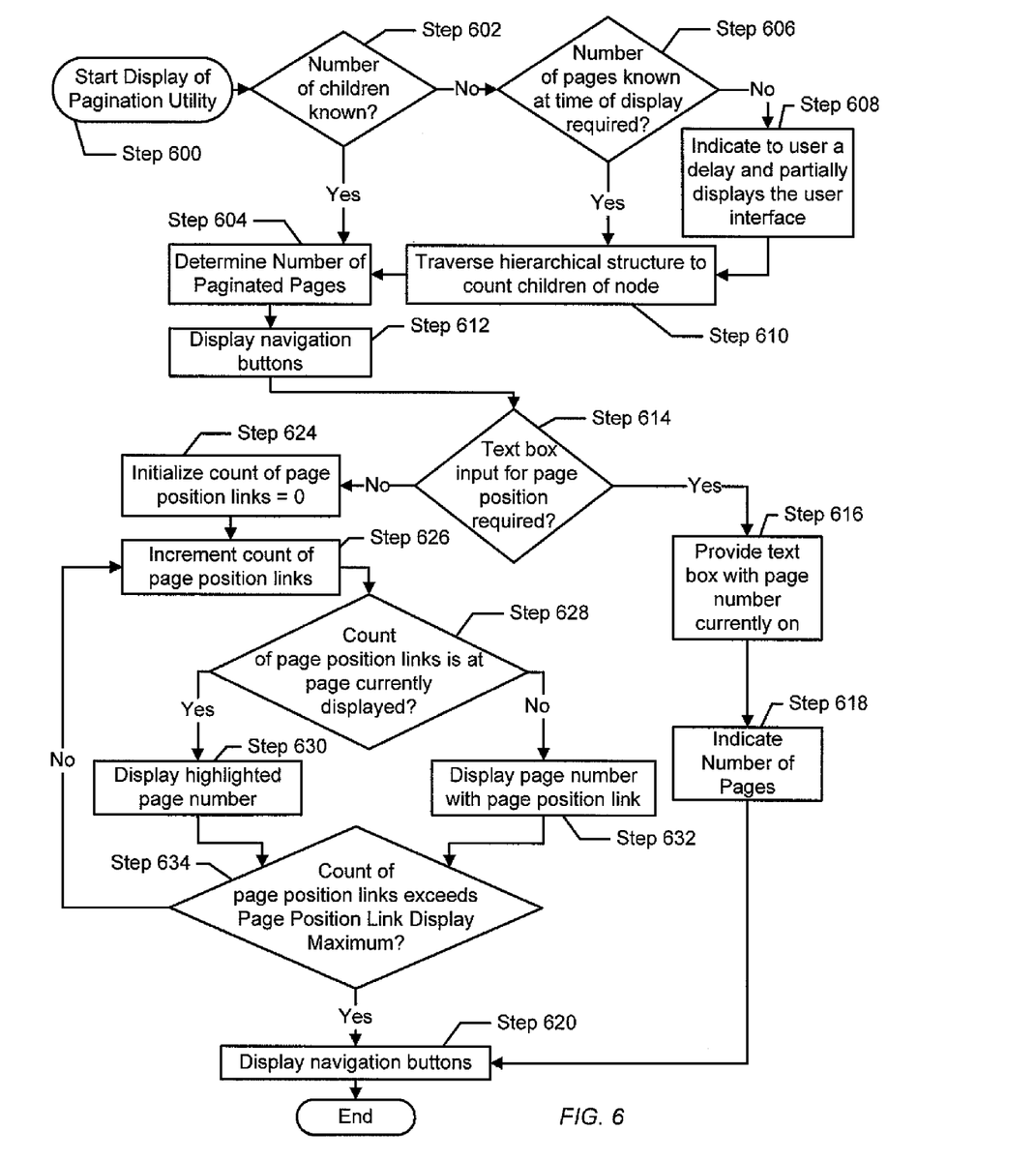

FIG. 6 shows a flowchart for displaying the pagination utility of a node (Step 600) in accordance with one embodiment of the invention. Initially, a determination is made whether the number of children nodes of the paginated node is known (Step 602). If the number of the children nodes of the paginated node is known, then the number of paginated pages of the paginated node is determined in a manner know to those skilled in the art (Step 604).

Alternatively, if the number of children is not known, then a determination is made whether the user requires the number of pagination pages be known at the time of initial display to the user (Step 606). In one embodiment of the invention, if the user does not require the number of pages to be known at the time of display, then the user does not need to have the number of paginated pages displayed immediately and the user interface indicates the necessity for the user to experience a delay in the complete display of the user interface (Step 608). Subsequently, the hierarchical structure is traversed (Step 610) to determine the number of paginated pages (Step 604) associated with the paginated node. For example, the user interface may present a partial display of the user interface that does not rely on the node for which the number of children is not known and indicate a delay to the user with a message. In one embodiment of the invention, the display of the user interface is delayed if the user prefers to have the number of pages be known at the time of display (Step 606), in which case the user interface is not displayed until the tree is traversed (Step 610) and the number of pages is determined (Step 604).

Continuing with FIG. 6, subsequently, the navigation control for the pagination utility is displayed using navigation buttons (Step 612). In one embodiment of the invention, the navigation buttons of the navigation control are configured to allow the user to select page positions prior to the current page position. At this stage, a determination is made as to whether the navigation control uses a page position text box to input the page position (Step 614). If a page position text box is required, then the text box is provided with the initial display of the current page position (Step 616), and the current page position may be altered using the page position text box by inputting a page position. Subsequently, the number of paginated pages is indicated for the paginated node (Step 618). Next, the navigation control for the pagination utility is provided in one embodiment with the use of navigation buttons (Step 620) configured to allow the user to select page positions subsequent to the current page position.

Alternatively, if a page position text box is not required for inputting a page position of the navigation control, then the navigation control of the pagination utility may be provided in the form of page position links. In this embodiment of the invention, the count of page position links is initialized to zero (Step 624) to ensure that the page position links display until page position link display maximum indicator is reached. Next, the count of page position links is incremented (Step 626), and a determination is made whether the count of page position links is associated with the currently displayed paginated page (Step 628).

If the page position link is for the paginated page currently displayed, then a highlighted page number associated with the currently displayed page position link is displayed (Step 630). Alternatively, if the page position link is not for the paginated page currently displayed, then the page position link is displayed with the corresponding page number (Step 632).

Subsequently, a determination is made whether the count of page position links exceeds the page position link display maximum indicator (Step 634). In one embodiment of the invention, if the count of page position links exceeds the page position link display maximum indicator, then navigation control forward buttons are displayed to allow the user to select page positions subsequent to the currently displayed paginated page (Step 614). Alternatively, if the if the count of page position links does not exceed the page position link display maximum indicator, then the process returns to Step 626 and Steps 628-634 are repeated.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising computer readable program code embodied therein for causing a computer system to display a user interface, the user interface comprising:
    a hierarchical structure comprising a first level of nodes, comprising:
        an identifier of a parent node, wherein the parent node comprises a first child node
        and a second child node;
        an identifier of the first child node;
        an identifier of the second child node;
        and
        a first pagination utility associated with a parent or a child node that is displayed within the hierarchical structure, the first pagination utility being configured to display a first paginated page for a first paginated node, wherein the first paginated node is the second child node, wherein the first paginated node comprises a plurality of child nodes of the first paginated node forming a second level of nodes in the hierarchical structure, wherein the first paginated page displays identifiers of a first portion of the plurality of child nodes of the first paginated node, wherein the first pagination utility comprises a page navigation control configured to enable a user to traverse to a second paginated page, wherein the second paginated page displays identifiers of a second portion of the plurality of child nodes of the paginated node
    the second level of nodes, comprising:
    a second pagination utility for one of the plurality of child nodes of the first paginated node, the second pagination utility being displayed within the first or second paginated page in the hierarchical structure, wherein the user is
    able to navigate to the second paginated node using the first pagination utility, wherein the second pagination utility is configured to display a third paginated page for the second paginated node.

2. The non-transitory computer readable medium of claim 1, further comprising:
    a page position for the first pagination utility configured to display the paginated pages based on a user-specified page number.

3. The non-transitory computer readable medium of claim 2, wherein the first pagination utility comprises:
    a page position link configured to allow a user to display the first paginated page upon selection by a user, wherein the first paginated page corresponds to the page position.

4. The non-transitory computer readable medium of claim 2, further comprising:
    a peek view facility configured to display peek view data comprising an identifier of a child node of the first paginated node and a page position of the child node of the first paginated node.

5. The non-transitory computer readable medium of claim 1, further comprising:
    a paginated page number indicator denoting a number of paginated pages; and a data display maximum indicator denoting a maximum number of identifiers of the plurality of child nodes of the first paginated node can display on any paginated page of the first paginated node, wherein the paginated page number indicator depends on a number of the plurality of child nodes of the first paginated node and the data display maximum indicator.

6. The non-transitory computer readable medium of claim 5, further comprising:

a page position link display maximum indicator denoting a maximum number of page position links to display, wherein the maximum number of page position links displayed depends on the number of paginated pages and the page position link display maximum indicator.

7. The non-transitory computer readable medium of claim 5, wherein the first pagination utility includes a page position link navigation control, wherein the page position link navigation control allows a user to change the page position links displayed.

8. The non-transitory computer readable medium of claim 5, further comprising:

a page position text box comprising a user modifiable input text box wherein user modifiable text in the user modifiable input text box is the page position for the display of the corresponding page by the first pagination utility.

9. The non-transitory computer readable medium of claim 1, wherein the hierarchical structure is displayed in a table view.

10. The non-transitory computer readable medium of claim 9, wherein the table view is sorted based on table headings.

11. The non-transitory computer readable medium of claim 1, wherein the first portion of child nodes of the first paginated node is viewable without scrolling horizontally.

12. The non-transitory computer readable medium of claim 1, wherein the first pagination utility is displayed horizontally.

13. The non-transitory computer readable medium of claim 1, wherein the hierarchical structure is a binary tree.

14. The non-transitory computer readable medium of claim 1, further comprising:

an expander comprising an indicator of data associated with the parent node wherein the data associated with the parent node is the first child node; and an expansion view comprising the display of the identifier of first child node and identifier of second child node associated with the parent node, wherein the expander allows a user to select the expansion view.

15. A method for generating a user interface comprising:

obtaining a hierarchical structure comprising a first level of nodes comprising an identifier of a parent node, an identifier of first child node, and an identifier of a second child node, wherein the parent node comprises the first child node and the second child node;

configuring a first pagination utility to display a first paginated page for a first paginated node, wherein the first paginated node is the second child node, wherein the paginated node comprises a plurality of child nodes of the first paginated node, the plurality of child nodes of the first paginated node forming a second level within the hierarchical structure, wherein the first paginated page displays identifiers of a first portion of the plurality of child nodes of the first paginated node, and wherein the first pagination utility is associated with a parent or a child node of the first level of nodes and is displayed within the hierarchical structure, the first pagination utility comprising a page navigation control configured to enable a user to traverse to a second paginated page, wherein the second paginated page displays identifiers of a second portion of the plurality of child nodes of the first paginated node, the second level comprising a second pagination utility for one of the plurality of child nodes of the first paginated node, the second pagination utility being displayed within the first or a second paginated page in the hierarchical structure, wherein the user is able to navigate to the second paginated node using the first pagination utility, and wherein the second pagination utility is configured to display a third paginated page for the second paginated node.

16. The method for generating a user interface of claim 15, further comprising:

configuring the first pagination utility to display the paginated page for a page position, wherein the page position displays the paginated pages for a user-specified page number.

17. The method for generating a user interface of claim 16, further comprising:

configuring a peek view facility configured to display peek view data comprising an identifier of a child node of the first paginated node and a page position of the child node of the first paginated node.

18. The method of claim 15, wherein the hierarchical structure is displayed in a table view.

19. The method of claim 18, wherein the table view is sorted based on table headings.

20. A non-transitory computer readable medium comprising computer readable program code embodied therein for causing a computer system to display a user interface, the user interface comprising:

a hierarchical structure comprising a first level of nodes, comprising:

an identifier of a parent node, wherein the parent node comprises a first child node and a second child node;

an identifier of the first child node;

an identifier of the second child node; and a first pagination utility displayed within a parent or a child node of the hierarchical structure, the first pagination utility being configured to display a first paginated page for a first paginated node, wherein the first paginated node is the second child node;

an expander comprising an indicator of data associated with the parent node wherein the data associated with the parent node is the first child node; and an expansion view comprising the display of the identifier of first child node and identifier of second child node associated with the parent node, wherein the expander allows a user to select the expansion view, wherein the first paginated node comprises a plurality of child nodes of the first paginated node forming a second level of nodes in the hierarchical structure, wherein the first paginated page displays identifiers of a first portion of the plurality of child nodes of the first paginated node, and wherein the first pagination utility comprises a page navigation control configured to enable a user to traverse to a second paginated page, wherein the second paginated page displays identifiers of a second portion of the plurality of child nodes of the first paginated node the second level comprising a second pagination utility for one of the plurality of child nodes of the first paginated node, the second pagination utility being displayed within the first or a second paginated page in the hierarchical structure, wherein the user is able to navigate to the second paginated node using the first pagination utility, and wherein the second pagination utility is configured to display a third paginated page for the second paginated node.

* * * * *

UNITED STATES PATENT AND TRADEMARK OFFICE
CERTIFICATE OF CORRECTION

Page 1 of 1

PATENT NO. : 8,887,099 B1
APPLICATION NO. : 11/238332
DATED : November 11, 2014
INVENTOR(S) : Simeloff It is certified that error appears in the above-identified patent and that said Letters Patent is hereby corrected as shown below:

In the Specification

In column 3, line 4, after "elements of" insert -- the aforementioned computer system (114) may be located at a remote location --.

In column 3, line 40, after "skilled" insert -- in the art will appreciate that an expander may change appearances to indicate that --.

In the Claims

In column 10, line 37, in Claim 1, delete "node" and insert -- node, --, therefor.

In column 12, line 64, in Claim 20, delete "node" and insert -- node, --, therefor.

Signed and Sealed this
Sixteenth Day of June, 2015

Michelle K. Lee
*Director of the United States Patent and Trademark Office*